(12) United States Patent
Brakes (10) Patent No.: US 10,179,641 B2
(45) Date of Patent: Jan. 15, 2019

(54) TRACK CONTAINER (71) Applicant: AIRBUS OPERATIONS LIMITED, Bristol (GB)

(72) Inventor: David Brakes, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 16/102,339

(22) Filed: Aug. 13, 2018

(65) Prior Publication Data
US 2018/0362144 A1  Dec. 20, 2018

Related U.S. Application Data (62) Division of application No. 14/963,115, filed on Dec. 8, 2015.

(30) Foreign Application Priority Data

Dec. 15, 2014 (GB) .................................. 1422311.9

(51) Int. Cl.
*B64C 9/00* (2006.01)
*B64C 9/22* (2006.01)

(52) U.S. Cl.
CPC ................ *B64C 9/00* (2013.01); *B64C 9/22* (2013.01); *Y02T 50/32* (2013.01)

(58) Field of Classification Search
CPC .... B64C 9/22; B64C 9/00; B64C 9/24; B64C 3/50; B64C 9/18; B64C 9/323; B64C 9/02; B64C 13/40; B64D 2045/001; Y02T 50/44; Y02T 50/145; Y02T 50/166; Y02T 50/32
See application file for complete search history.

(56) References Cited

U.S. PATENT DOCUMENTS

| | | | | |
|---|---|---|---|---|
| 2,343,986 A * | 3/1944 | Leutholt | ................... | B64C 3/48 244/134 A |
| 2,620,147 A * | 12/1952 | Cook, Jr. | ................... | B64C 9/16 244/216 |
| 3,426,982 A * | 2/1969 | Markwood | ............. | B64C 27/28 244/17.19 |
| 3,785,594 A * | 1/1974 | Lee | ........................... | B64C 9/16 244/216 |
| 4,360,176 A * | 11/1982 | Brown | ...................... | B64C 9/24 244/214 |
| 4,399,970 A * | 8/1983 | Evans | ....................... | B64C 9/24 244/214 |
| 4,437,631 A * | 3/1984 | Martens | .................... | B64C 9/24 244/210 |
| 4,469,297 A * | 9/1984 | Cole | ....................... | B64C 13/30 244/215 |
| 4,470,569 A * | 9/1984 | Shaffer | ..................... | B64C 9/22 244/213 |
| 4,471,927 A * | 9/1984 | Rudolph | ................... | B64C 9/16 244/215 |
| 4,471,928 A * | 9/1984 | Cole | ......................... | B64C 9/00 244/215 |

(Continued)

Primary Examiner — Medhat Badawi
(74) Attorney, Agent, or Firm — Nixon & Vanderhye P.C.

(57) ABSTRACT

A track container for receiving the track of a lift device actuator is disclosed. The track container is elastically deformable from a rest position to a deflected position to accommodate the track. The track container includes a guide member in the form of a leaf spring configured to guide the track into the track container.

15 Claims, 11 Drawing Sheets

(56) References Cited

U.S. PATENT DOCUMENTS

| | | | | |
|---|---|---|---|---|
| 4,640,477 A * | 2/1987 | Pace | B64C 9/22 | 244/130 |
| 4,650,140 A * | 3/1987 | Cole | B64C 9/24 | 244/214 |
| 4,687,162 A * | 8/1987 | Johnson | B64C 9/24 | 244/213 |
| 4,753,402 A * | 6/1988 | Cole | B64C 9/22 | 244/210 |
| 4,784,354 A * | 11/1988 | Tavano | B64D 37/06 | 244/135 B |
| 4,838,503 A * | 6/1989 | Williams | B64C 9/22 | 244/213 |
| 5,417,778 A * | 5/1995 | Nachtrab | C22C 25/00 | 148/400 |
| 5,544,847 A * | 8/1996 | Bliesner | B64C 9/24 | 244/214 |
| 5,628,477 A * | 5/1997 | Caferro | B64C 9/02 | 244/195 |
| 5,680,124 A * | 10/1997 | Bedell | B64D 45/0005 | 244/194 |
| 5,686,907 A * | 11/1997 | Bedell | B64D 45/0005 | 244/194 |
| 5,806,805 A * | 9/1998 | Elbert | B64C 13/42 | 244/195 |
| 5,839,699 A * | 11/1998 | Bliesner | B64C 9/24 | 244/214 |
| 5,927,656 A * | 7/1999 | Hinkleman | B64C 9/24 | 244/203 |
| 6,015,117 A * | 1/2000 | Broadbent | B64C 7/00 | 244/214 |
| 6,149,105 A * | 11/2000 | Jaggard | B64C 9/28 | 244/214 |
| 6,796,534 B2 * | 9/2004 | Beyer | B64C 3/48 | 244/214 |
| 7,744,034 B2 * | 6/2010 | Coughlin | B64C 9/16 | 244/129.4 |
| 7,878,459 B2 * | 2/2011 | Mabe | B64C 9/32 | 244/213 |
| 8,424,807 B2 | 4/2013 | Sutton et al. | | |
| 9,452,823 B2 * | 9/2016 | Haver | B64C 9/16 | |
| 9,550,559 B1 * | 1/2017 | Droney | B64C 9/18 | |
| 2001/0035477 A1 * | 11/2001 | Fink | B64C 3/50 | 244/215 |
| 2001/0038058 A1 * | 11/2001 | Gleine | B64C 3/46 | 244/198 |
| 2002/0005462 A1 * | 1/2002 | Broadbent | B64C 9/22 | 244/214 |
| 2002/0100842 A1 * | 8/2002 | Perez | B64C 3/48 | 244/219 |
| 2002/0195527 A1 * | 12/2002 | Broadbent | B64C 9/26 | 244/214 |
| 2005/0178925 A1 * | 8/2005 | Broadbent | B64C 9/22 | 244/214 |
| 2006/0000952 A1 * | 1/2006 | Rampton | B64C 9/22 | 244/214 |
| 2006/0102803 A1 * | 5/2006 | Wheaton | B64C 7/02 | 244/214 |
| 2007/0034747 A1 * | 2/2007 | Amorosi | B64C 9/22 | 244/215 |
| 2007/0045477 A1 * | 3/2007 | Armstrong | B64C 9/22 | 244/214 |
| 2007/0102587 A1 * | 5/2007 | Jones | B64C 9/22 | 244/214 |
| 2007/0241236 A1 * | 10/2007 | Whitehouse | B64C 9/24 | 244/214 |
| 2008/0092973 A1 * | 4/2008 | Lai | F16L 11/11 | 138/118 |
| 2008/0105320 A1 * | 5/2008 | Kamiyama | E03F 3/06 | 138/97 |
| 2009/0001224 A1 * | 1/2009 | Perez-Sanchez | B64C 9/22 | 244/214 |
| 2009/0072093 A1 * | 3/2009 | Fox | B64C 9/22 | 244/214 |
| 2009/0127402 A1 * | 5/2009 | Jaggard | B64C 9/02 | 244/213 |
| 2009/0272853 A1 * | 11/2009 | Raudszus | B64C 3/50 | 244/214 |
| 2009/0302168 A1 * | 12/2009 | Hetrick | B64C 3/48 | 244/214 |
| 2010/0025537 A1 * | 2/2010 | Wheaton | B64C 7/02 | 244/214 |
| 2010/0084515 A1 * | 4/2010 | Jaggard | B64C 3/50 | 244/214 |
| 2010/0116944 A1 * | 5/2010 | Wollaston | B64C 9/24 | 244/214 |
| 2010/0163685 A1 * | 7/2010 | Vormezeele | B64C 9/22 | 244/214 |
| 2010/0258674 A1 * | 10/2010 | Sutton | B29C 43/12 | 244/123.1 |
| 2010/0327111 A1 * | 12/2010 | Sanderson | B64C 9/22 | 244/99.3 |
| 2011/0024566 A1 * | 2/2011 | Soenarjo | B64D 15/12 | 244/131 |
| 2011/0024575 A1 * | 2/2011 | Wheaton | B64C 7/02 | 244/214 |
| 2011/0084174 A1 * | 4/2011 | Hemmelgarn | B64C 3/48 | 244/200 |
| 2011/0290945 A1 * | 12/2011 | Peirce | B64C 9/22 | 244/213 |
| 2011/0290946 A1 * | 12/2011 | Peirce | B64C 9/22 | 244/213 |
| 2012/0012712 A1 * | 1/2012 | Eden | B64C 3/28 | 244/201 |
| 2014/0339358 A1 * | 11/2014 | Swartley | H01R 41/00 | 244/99.3 |
| 2014/0361529 A1 * | 12/2014 | McCormick | F16L 51/00 | 285/55 |
| 2015/0136267 A1 * | 5/2015 | Yu | E03C 1/20 | 138/109 |
| 2016/0167766 A1 * | 6/2016 | Brakes | B64C 9/00 | 244/99.2 |

\* cited by examiner

TRACK CONTAINER

CROSS RELATED APPLICATION

This application is a divisional of application Ser. No. 14/963,115, filed Dec. 8, 2015, now pending; which claims priority benefit to United Kingdom (GB) patent Application No. 1422311.9, filed Dec. 15, 2014; the entire contents of which are hereby incorporated by reference.

INTRODUCTION

The present invention relates to a track container for receiving the track of a lift device actuator and to an aircraft structure comprising the same.

BACKGROUND

Conventional aircraft typically comprise lift devices to control the coefficient of lift of the wings so that the aircraft can fly at slower speeds during landing or when performing manoeuvres. Each lift device, for example, a flap or slat, comprises an aerodynamic surface that is moved relative to an edge of the aircraft wing to control the angle of attack of the wing.

The lift device is moved relative to the aircraft wing by a lift device actuator. The lift device actuator comprises a track, a pinion gear, and a track container that receives the track. The lift device is coupled to an end of the track. The pinion gear engages with the track and is rotated to move the track into and out of the track container, which moves the lift device relative to the aircraft wing.

SUMMARY OF INVENTION

According to the invention, there is provided a track container for receiving the track of a lift device actuator, wherein the track container is elastically deformable from a rest position to a deflected position to accommodate said track.

The track container may comprise a peripheral wall with a corrugated or concertina configuration. The corrugated or concertina configuration may be configured to allow for elastic deformation of the track container.

The track container may comprise a biasing member that is configured to elastically bias the track container into the rest position.

In one embodiment, the track container is elastically deformable in a direction transverse the central axis of the track container.

The track container may be configured such that if the track is retracted into the track container when ice is present in the track container, the track container elastically deforms to accommodate the ice and the track. In one such embodiment, the track follows a curved path when retracted into the track container and wherein the track container has a curved shape when in the rest position that corresponds to said curved path of the track.

The track container may be configured such that the track exerts a force on the track container each time the track is retracted into the track container to urge the track container into the deflected position. The track container may be substantially straight in the lengthwise direction when the track container is in the rest position and may be configured such that when the track container is mounted to an aircraft structure the track container extends substantially horizontally in the lengthwise direction of the track container.

In one embodiment, the track container comprises a guide member configured to guide said track into the track container. The guide member may be configured such that when said track is retracted into the track container said track exerts a force on the guide member that causes the guide member to urge the track container into the deflected position.

In one embodiment, the guide member comprises a leaf spring. In an alternative embodiment, the guide member comprises a resilient sheath and, preferably, the resilient sheath comprises an elastomeric material.

In one embodiment, the track container is manufactured from a fibre reinforced plastic. In an alternative embodiment, the track container is manufactured from a low ductility metal, and, preferably, comprises an aluminium casting.

In one embodiment, the track container is configured to receive a curved track and, preferably, a curved slat track.

According to another aspect of the invention, there is provided an aircraft structure comprising a lift device, a track and a track container according to the invention.

DESCRIPTION OF THE EMBODIMENTS

Referring to FIGS. 1 to 9, an aircraft 1 comprising a known wing assembly 1A is shown. The wing assembly IA comprises a wing body 2 having a leading edge 2A and a trailing edge 2B. The wing body 2 comprises upper and lower covers with a spar 2C extending therebetween. A fuel tank 3 is disposed on the inside of the wing body 2.

The wing assembly 1A has a plurality of lift devices each in the form of a slat 4 that is moveable relative to the leading edge 2A of the wing body 2 by a lift device actuator 5. The slat 4 comprises an aerodynamic surface 4A that is moveable relative to the wing body 2 to control the lift coefficient of the wing assembly as is well known in the art.

The lift device actuator 5 comprises a curved track 6, a pinion gear 7 and a track container 8. The track container 8 comprises a vessel 8A (see FIGS. 4 to 9) having an open end 8B and a closed end 8C that is distal to the open end 8B. The vessel 8A has a generally circular cross-section when viewed in the lengthwise direction of the track container 8. The vessel 8A is generally curved to correspond to the curvature of the track 6. The track container 8 is disposed within the wing body 2 and extends into the fuel tank 3. The open end 8B of the vessel 8A faces generally towards the leading edge 2A of the wing body 2 and comprises a flanged portion 8D that is attached to a spar 2C to secure the track container 8 in position inside the wing body 2.

A first end of the track 6 comprises a coupling 6A that is attached to the slat 4. A second end of the track 6, which is distal to the first end, comprises a free end 6B that extends into the track container 8.

Figure 4:
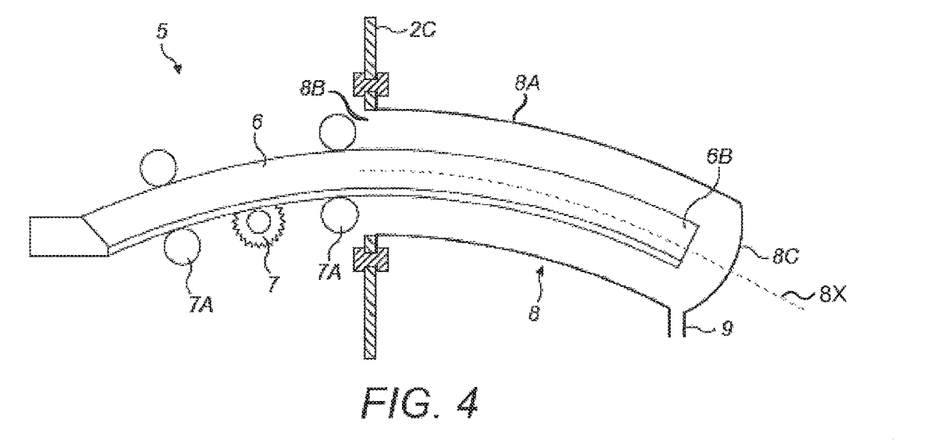
FIG. 4 is a schematic side view of a lift device actuator of the known wing assembly of FIG. 1, in a cruise position.

The lift device actuator 5 is moveable between a cruise position and a deployed position. When the lift device actuator 5 is in the cruise position, a substantial portion of the track 6 is received in the track container 8 (as shown in FIG. 4) and the slat 4 is located proximate to the leading edge 2A of the wing body 2 (as shown by the chain-dashed line in FIG. 3). Track container 8 has a central axis 8X. In the cruise position, the slat 4 is positioned to minimise the aerodynamic drag of the wing assembly IA to increase the cruising speed of the aircraft 1.

Figure 5:
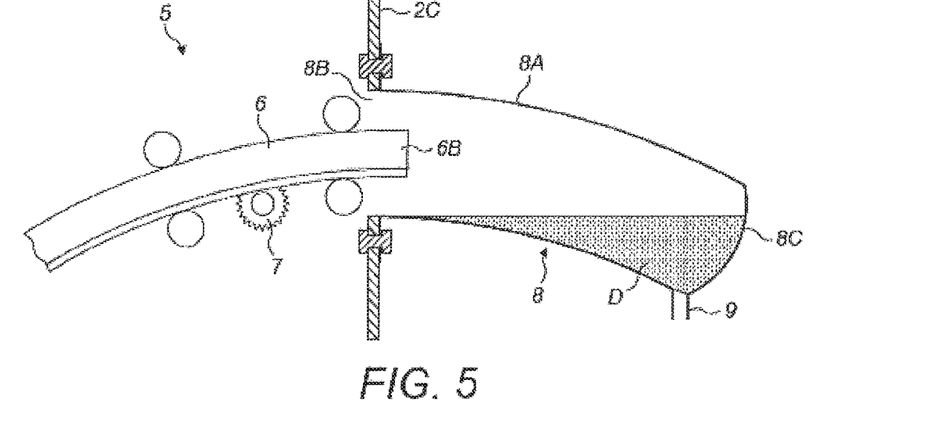
FIG. 5 is a schematic side view of the lift device actuator of FIG. 4, in a deployed position.

To move the lift device actuator 5 to the deployed position, the pinion gear 7 is rotated, for example by an electric motor (not shown), to urge the track 6 out of the track container 8 such that the slat 4 moves downwardly in an arcuate path away from the leading edge 2A of the wing body 2. In the deployed position, the track 6 extends out of the wing body 2 (as shown in FIG. 5) and the slat 4 is spaced from the leading edge 2A (as shown by the solid line in FIG. 3) such that the lift coefficient of the wing assembly 1A is increased to reduce the stall speed of the aircraft 1 for landing and the length of runway required for takeoff. A plurality of rollers 7A guides the track 6 when the lift device actuator 5 is moved between the cruise and deployed positions.

When the lift device actuator 5 is in the deployed position, rain water and ambient moisture is able to enter into the track container 8 through a gap between the slat 4 and the leading edge 2A of the wing body 2. This water accumulates in the lower closed end 8C of the track container 8 and may freeze, as a result of the low ambient temperatures that the aircraft 1 is subjected to during high altitude flight, to form an ice deposit D (as shown in FIG. 5). The ice deposit D in the track container 8 increases the total mass of the wing assembly 1A and therefore reduces the speed and fuel efficiency of the aircraft 1.

To prevent the accumulation of water in the track container 8 and therefore the formation of an ice deposit D, it is known to provide a drainage pipe 9 in the closed end 8C of the track container 8 at the lowest point thereof to allow for water that has accumulated in the closed end 8C to be drained. However, it has been found that the drainage pipe 9 can become blocked, for example, due to debris becoming lodged in the drainage pipe 9 or the water freezing in the drainage pipe 9. This can prevent the water from draining out of the track container 8 and therefore can result in an ice deposit D forming therein. in addition, the drainage pipe 9 passes through the fuel tank 3 and therefore reduces the capacity of the fuel tank 3 and increases the manufacturing complexity of the wing assembly 1A since any interfaces between the drainage pipe 9 and the fuel tank 3 must be sealed and reinforced. Furthermore, the drainage pipe 9 increases the mass of the wing assembly 1A.

Figure 6:
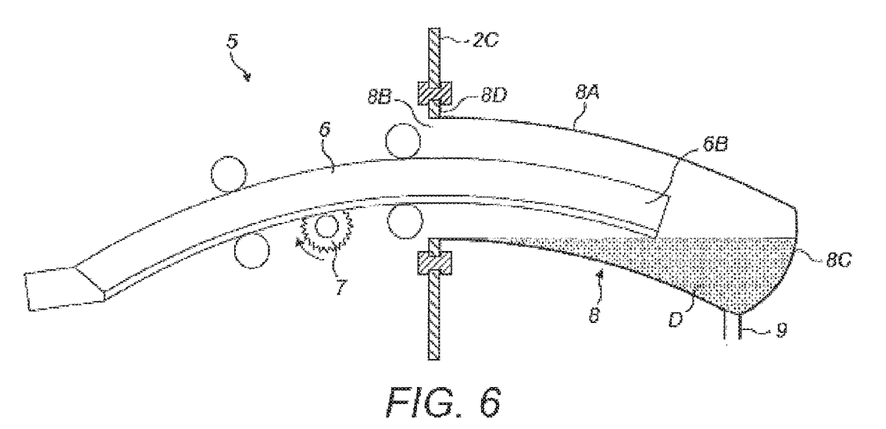
FIG. 6 is a schematic side view of the lift device actuator of FIG. 4, in an intermediate position between the deployed position and the cruise position.
Figure 7:
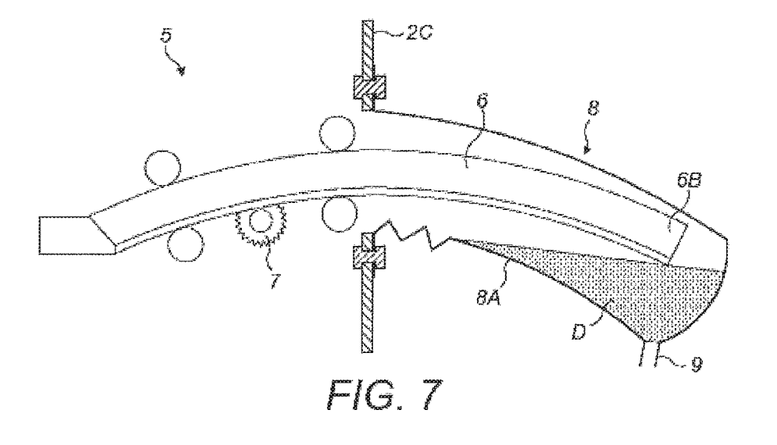
FIG. 7 is a schematic side view of the lift device actuator of FIG. 4, in the cruise position and wherein a track container thereof is deformed.

It has been found that the formation of an ice deposit D in the track container 8 when the lift device actuator 5 is in the deployed position can result in deformation of the track container 8 when the lift device actuator 5 is subsequently moved to the cruise position. More specifically, when the lift device actuator 5 is moved towards the cruise position, the free end 6B of the track 6 will be urged against the ice deposit D as the track 6 is retracted into the track container 8 (as shown in FIG. 6). Therefore, the free end 6B of the track 6 will exert a force on the ice deposit D that causes a bending moment to be exerted on the track container 8 by the track 6, which can result in the track container 8 bending downwardly with respect to the wing body 2 and becoming deformed (as shown in FIG. 7). Thus, the track container 8 must be manufactured from a high ductility material, for example, welded aluminium alloy 6061 or a titanium alloy, to ensure that the track container 8 does not rupture when it is deformed. However, track containers fabricated from such high ductility materials are generally expensive and/or heavy. Furthermore, it can be difficult to fabricate the track container 8 from high ductility sheet material. It is desirable to avoid rupturing of the track container 8 in order to prevent fuel leakage, since the track container 8 forms a boundary of the fuel tank 3.

Figure 8:
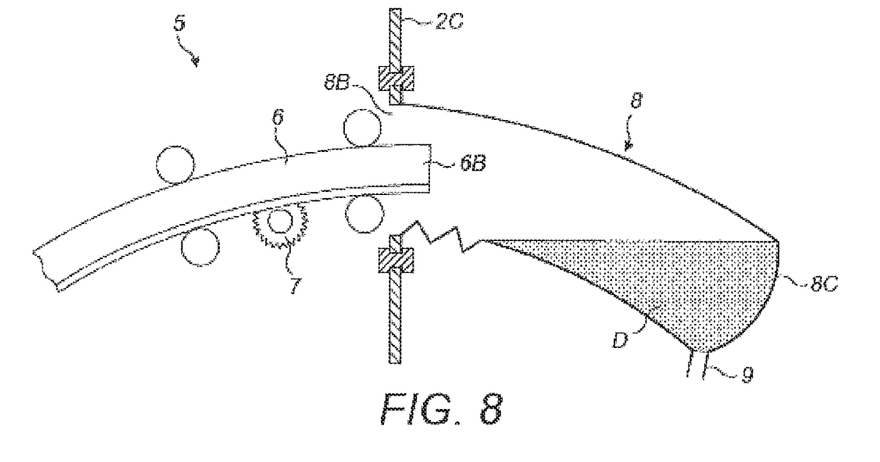
FIG. 8 is a schematic side view of the lift device actuator of FIG. 4 in the deployed position and wherein the track container thereof is deformed.
Figure 9:
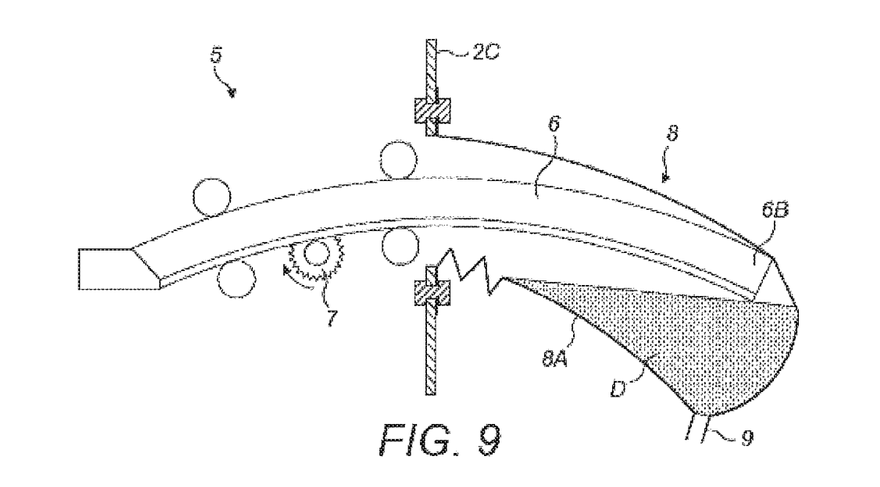
FIG. 9 is a schematic side view of the lift device actuator of FIG. 4, in the cruise position and wherein track container thereof is further deformed.

If the track container 8 is deformed and the lift device actuator 5 is subsequently moved back to the deployed position (as shown in FIG. 8), the track container 8 will remain deformed and further water may enter into the track container 8 through the gap between the slat 4 and the leading edge 2A of the wing body 2. This additional water in the track container 8 may freeze to increase the size of the ice deposit a Therefore, if the lift device actuator 5 is subsequently moved towards the cruise position, the free end 6B of the track 6 will be urged against the increased size ice deposit D as the track 6 is retracted into the track container 8. Therefore, the free end 6B of the track 6 will exert a force on the ice deposit D that causes the track container 8 to bend downwardly and further deform (as shown in FIG. 9). The track container 8 will remain deformed even when the lift device actuator 5 is moved back to the deployed position. Therefore, it will be necessary to repair or replace the track container 8.

To prevent the track 6 from penetrating through the track container 8 in the event that the lift device actuator 5 is moved to the cruise position and the track container 8 is already deformed, or in the event that the track 6 becomes misaligned with the rollers 7A such that it deviates from its normal path into the track container 8, the diameter of the track container 8 is made sufficiently large that there is a gap between the track 6 and the peripheral wall of the track container 8 in the radial direction of the track container 8. However, increasing the diameter of the track container 8 increases the weight of the aircraft 1 and takes up more space in the fuel tank 3, reducing the capacity of the fuel tank 3.

Embodiments of the invention will now be described, by way of example only, with reference to FIGS. 10 to 21 of the accompanying drawings.

Referring now to FIGS. 10 to 14, a lift device actuator 10 comprising a track container 11 according to a first embodiment of the invention is shown. The lift device actuator 10 of the first embodiment of the invention further comprises a curved track 6 and a pinion gear 7 that are similar to the track 6 and pinion gear 7 of the known lift device actuator 5 described above in relation to FIGS. 1 to 9. The pinion gear 7 is configured to move the track 6 relative to the track container 11 such that a lift device is moved relative to an aircraft structure to control the aerodynamic profile of the aircraft structure. In the present embodiment, the lift device is in the form of a slat (not shown) and the aircraft structure is in the form of a wing assembly having upper and lower covers (not shown) with a spar 2C extending therebetween.

The track container 11 comprises a vessel 11A having an open end 11B and a closed end 11C that is distal to the open end 11B. The vessel 11A has a generally circular cross-section when viewed in the lengthwise direction of the track container 11. The vessel 11A is generally curved to correspond to the curvature of the track 6. The track container 11 is disposed within the wing body (not shown) of the wing assembly. The open end 11B of the vessel 11A faces generally towards the leading edge of the wing body and comprises a flanged portion 12 that is attached to a spar 2C of the wing assembly to secure the track container 11 in position.

Figure 10:
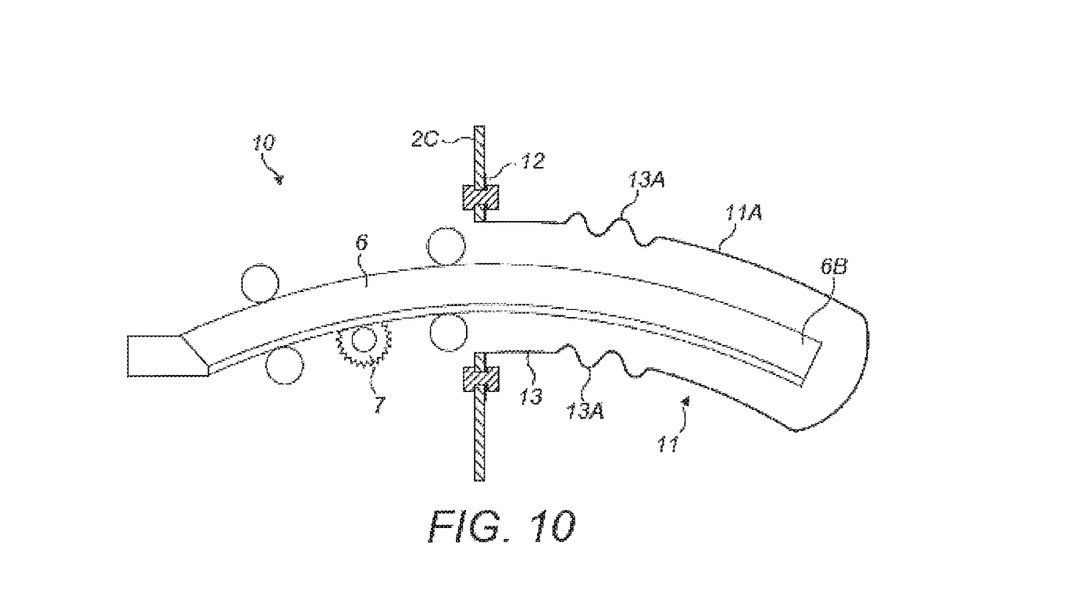
FIG. 10 is a schematic side view of a lift device actuator according to a first embodiment of the invention, in a cruise position.
Figure 11:
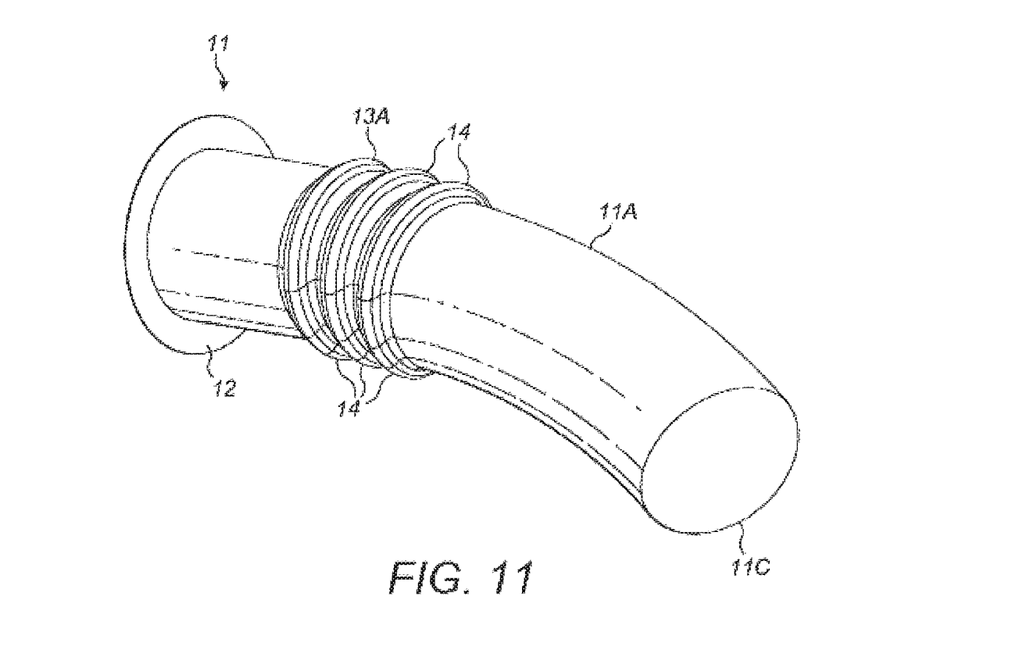
FIG. 11 is a perspective view of a track container of the lift device actuator of FIG. 10.
Figure 14:
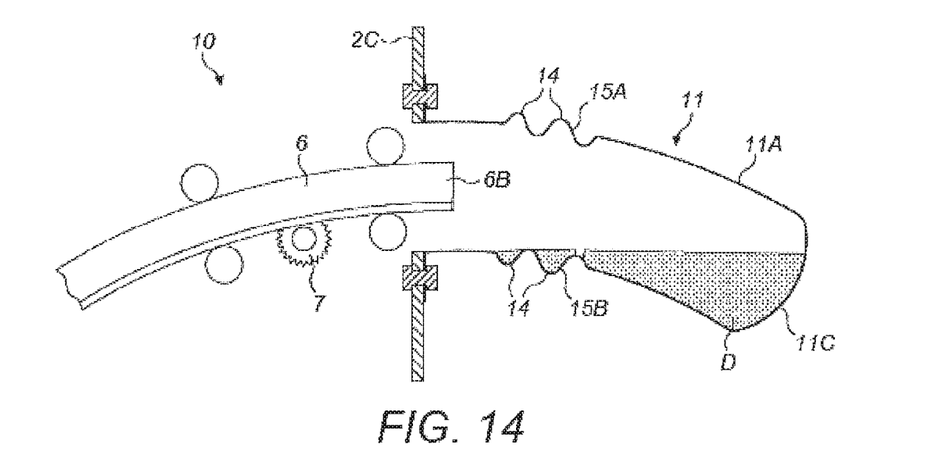
FIG. 14 is a schematic side view of the lift device actuator of FIG. 10, in the deployed position.

A first end 6A of the track 6 is coupled to the slat and a distal second end of the track 6 comprises a free end 6B that extends into the track container 11, Similarly to the known lift device actuator 5 described above in relation to FIGS. 1 to 9, the lift device actuator 10 of the first embodiment of the invention is moveable between a cruise position, wherein a substantial portion of the track 6 is received in the track container 11 (as shown in FIG. 10), and a deployed position, wherein a substantial portion of the track 6 extends out of the track container 11 (as shown in FIG. 14).

The track container 11 comprises a peripheral wall 13 having a flexible section 13A. The flexible section 13A has a concertina or corrugated arrangement comprising a plurality of ridges 14. The ridges 14 allow for elastic deformation of the peripheral wall 13 of the track container 11. Each of the ridges 14 extends circumferentially around the periphery of the track container 11.

Figure 1:
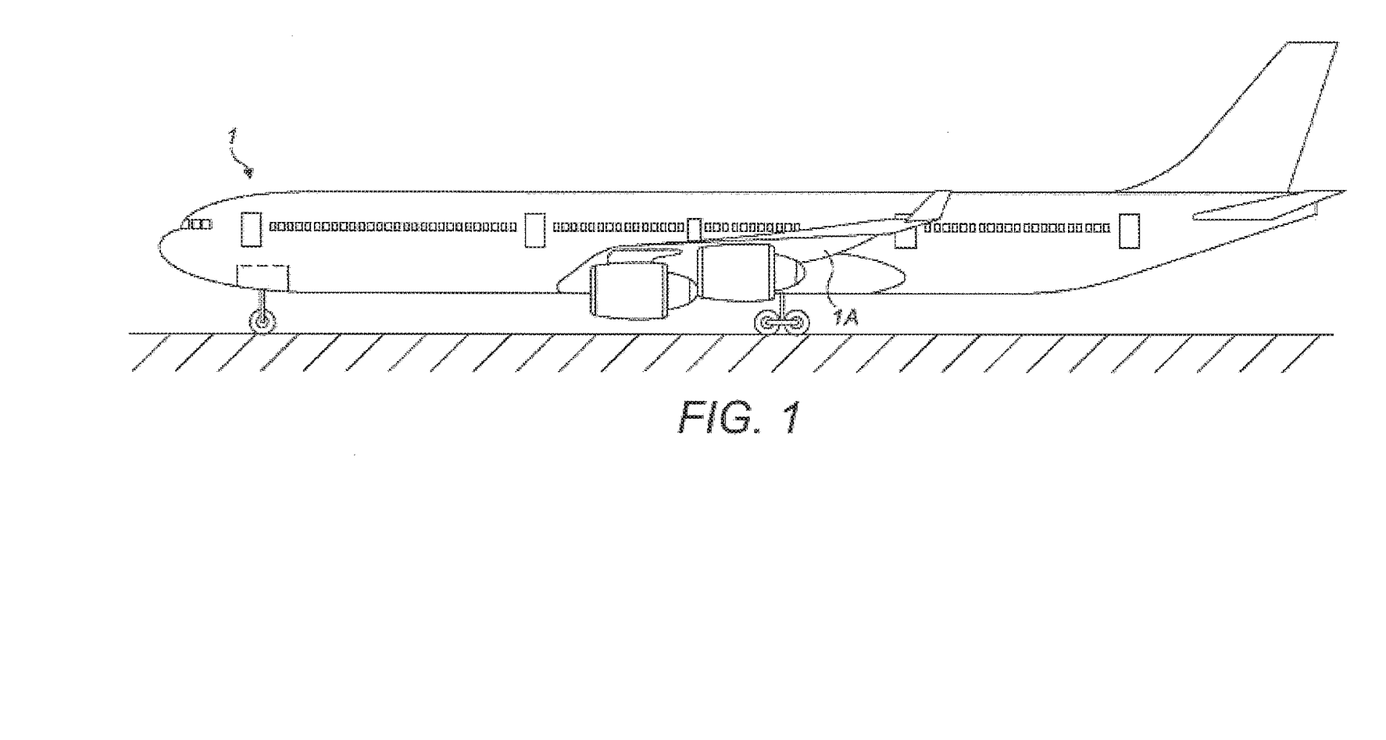
FIG. 1 is a side view of an aircraft comprising a known wing assembly.
Figure 2:
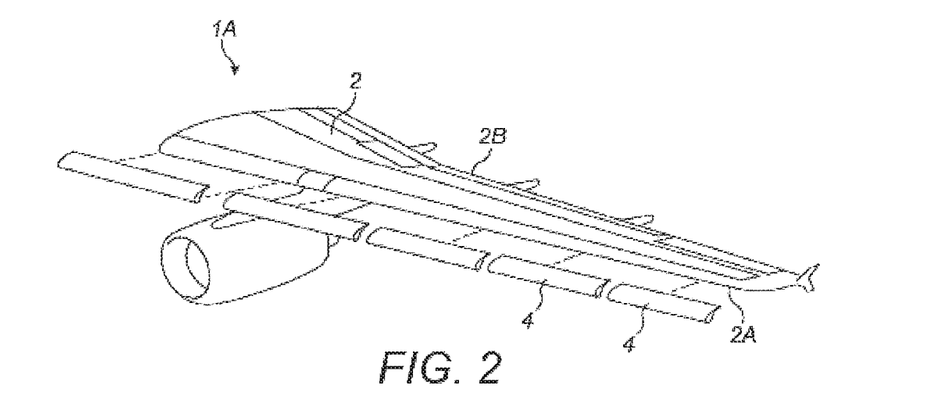
FIG. 2 is a perspective view of the known wing assembly of FIG. 1.
Figure 3:
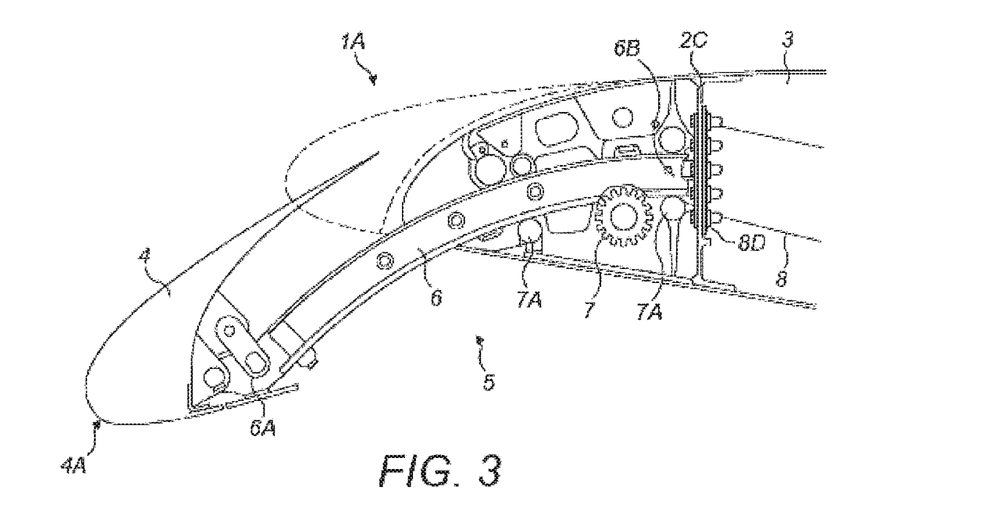
FIG. 3 is a cross-sectional side view of a portion of the known wing assembly of FIG. 1.

The track container 11 comprises a first side 15A and an opposing second side 15B. The track container 11 is configured such that when the track container 11 is secured to the spar 2C of the wing assembly and the aircraft is grounded (as shown in FIG. 1), the track container 11 curves downwardly in a direction away from the spar 2C. Furthermore, the first side 15A of the track container 11 faces upwardly and the second side 15B faces towards the ground.

The position of the track container 11 when no force is exerted thereon by the track 6, and thus the track container 11 is not deformed, is referred to hereinafter as the 'rest position' (as shown in FIG. 10).

Figure 12:
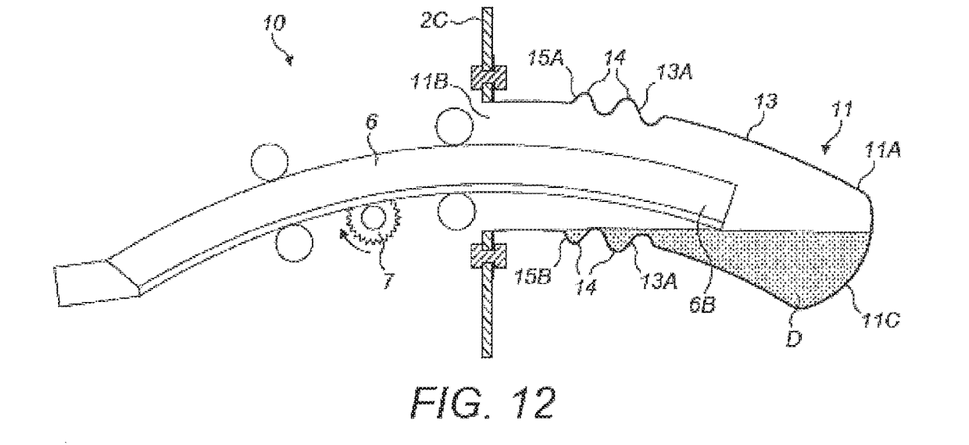
FIG. 12 is a schematic side view of the lift device actuator of FIG. 10, in an intermediate position between the cruise position and a deployed position.
Figure 13:
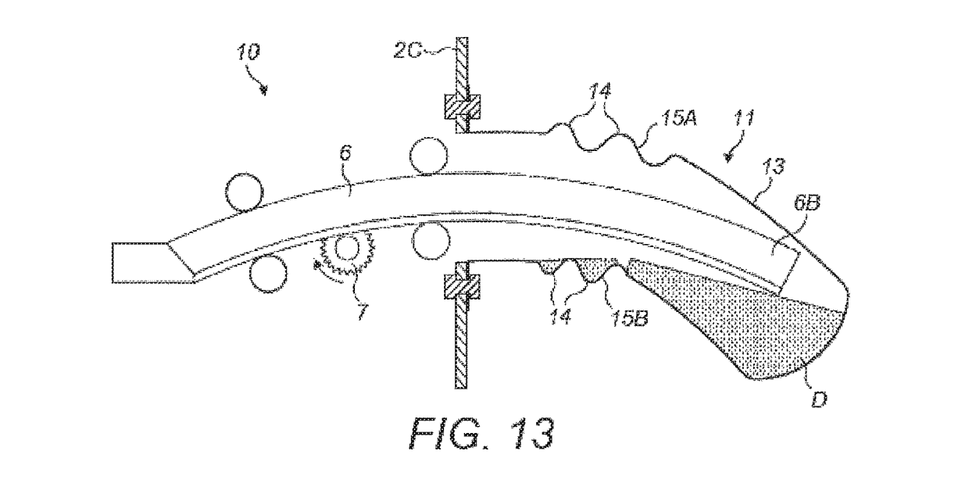
FIG. 13 is a schematic side view of the lift device actuator of FIG. 10, in the cruise. position and wherein the track container thereof is deformed.

When the lift device actuator 10 is in the deployed position, rain water and ambient moisture is able to enter into the track container 11 through a gap between the slat and the wing body. This water accumulates in the lower closed end 11C of the track container 11 and may freeze to form an ice deposit ID, If the lift device actuator 10 is then moved towards the cruise position, the free end 6B of the track 6 will be urged against the ice deposit D as the track 6 is retracted into the track container 11 (as shown in FIG. 12). Therefore, the free end 6B of the track 6 will exert a force on the ice deposit D that causes a bending moment to be exerted on the track container 11 by the track 6. This bending moment urges the track container 11 to bend downwardly into a 'deflected position' (as shown in FIG. 13). When the track container 11 moves to the deflected position, the portions of the ridges 14 that are on the first side 15A of the track container 11 are urged away from each other such that the spacing therebetween increases and the portions of the ridges 14 on the second side 15B are urged towards each other such that the spacing therebetween decreases.

The peripheral wall 13 of the track container 11 is manufactured from a material having some resilience, for example, glass fibre reinforced plastic, carbon fibre reinforced plastic or a metal such as a castable aluminium alloy, for example D357. Therefore, when the lift device actuator 10 is moved back to the deployed position such that the free end 6B of the track 6 is no longer urged against the ice deposit D, the resilience of the material of the peripheral wall 13 will cause the portions of the ridges 14 on the first side 15A of the track container 11 to move back towards each other and the portions of the ridges 14 on the second side 15B of the track container 11 to move back away from each other such that the track container 11 is urged into the rest position (as shown in FIG. 14). Therefore, the corrugated flexible section 13A of the peripheral wall 13 acts like a flexible bellows such that the track container 11 is elastically deformable from the rest position to the deflected position.

The force of the resilient material of the peripheral wall 13 urging the track container 11 to return from the deflected position to the rest position is sufficient to break up the ice deposit D (as shown in FIG. 14). However, even if the force of the resilient material of the peripheral wall 13 is insufficient to break up the ice deposit D, the track container 11 will still return to the rest position when the ice deposit D melts.

The track container 11 is therefore configured to be elastically deformable such that if the track 6 is retracted into the track container 11 when an ice deposit D is formed therein, permanent plastic deformation of the track container 11 is avoided. Therefore, it is not necessary to repair or replace the track container 11 as frequently. Furthermore, since the track container 11 elastically deforms to accommodate the track 6, it is not necessary for the track container 11 to be manufactured from a high ductility material to prevent rupturing thereof. Therefore, the track container 11 can be manufactured from less expensive and/or lighter materials, for example, fibre reinforced plastic or an aluminium casting. It is simpler and less expensive to fabricate the track container 11 from such materials than from high ductility sheet material.

In addition, it is not necessary to include a drainage pipe in the track container 11 to drain the water that accumulates therein, since if said water freezes and the track 6 is then retracted into the track container 11, permanent deformation of the track container 11 is avoided. However, it will be recognised that alternative embodiments (not shown) wherein the track container 11 comprises a drainage pipe are intended to fall within the scope of the invention.

Referring now to FIGS. 15 to 21, a lift device actuator 20 comprising a track container 21 according to a second embodiment of the invention is shown. The lift device actuator 20 of the second embodiment of the invention is similar to the lift device actuator 10 of the first embodiment of the invention, with like features retaining the same reference numerals. A difference between the lift device actuator 20 of the second embodiment of the invention and the lift device actuator 10 of the first embodiment is that the track container 21 is of an alternative configuration.

The track container 21 of the lift device actuator 20 of the second embodiment of the invention comprises a vessel 21A having an open end 21B and a closed end 21C that is distal to the open end 21B. The vessel 21A is a substantially straight cylinder, having a circular cross-section when viewed in the lengthwise direction of the track container 21. The track container 21 is disposed within the wing body (not shown) of the wing assembly. The open end 21B of the vessel 21A faces generally towards the leading edge of the wing body and comprises a flanged portion 22 that is attached to a spar 2C of the wing assembly to secure the track container 21 in position.

Figure 15:
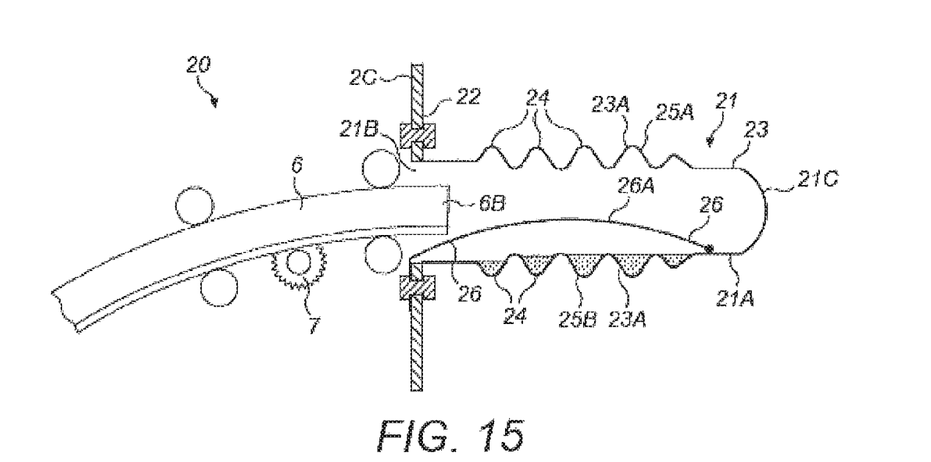
FIG. 15 is a schematic side view of a lift device actuator according to a second embodiment of the invention, in a deployed position.
Figure 16:
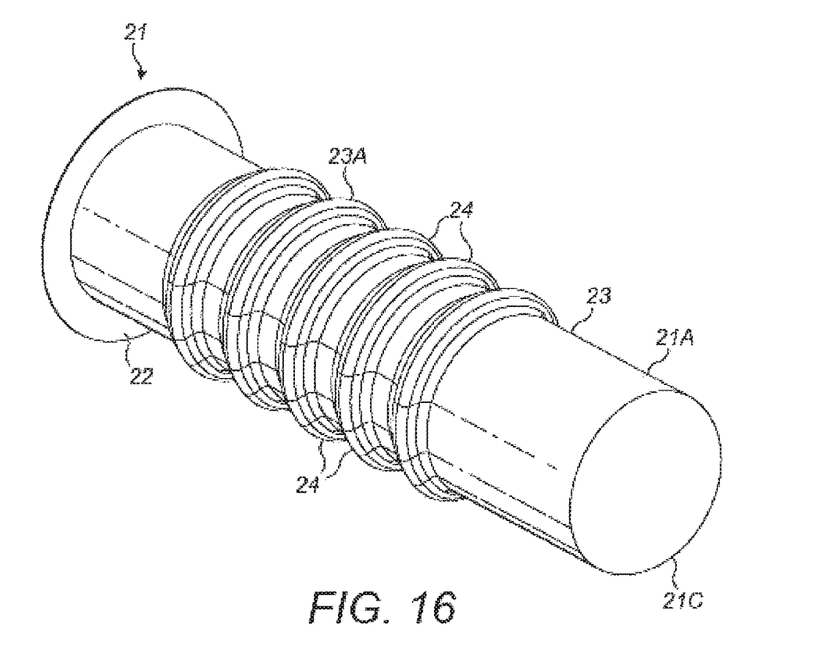
FIG. 16 is a perspective view of a track container of the lift device actuator of FIG. 15.
Figure 17:
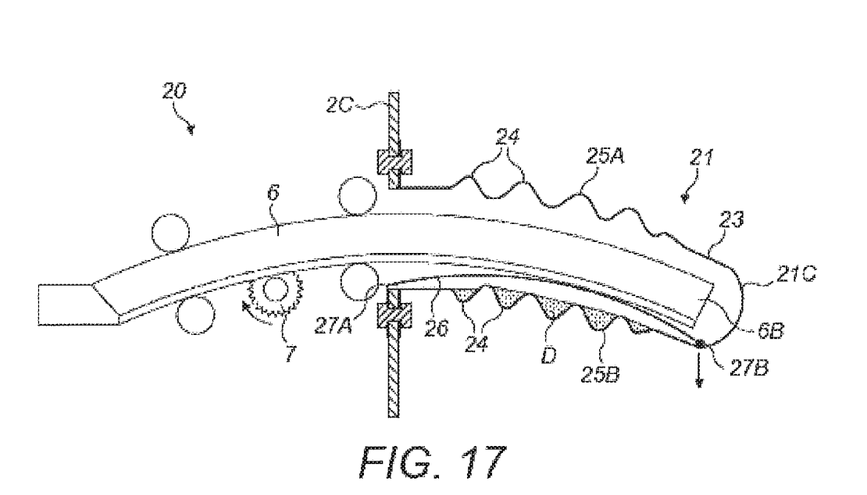
FIG. 17 is a schematic side view of the lift device actuator of FIG. 15, in a cruise position.

Similarly to the lift device actuator 10 of the first embodiment of the invention, the lift device actuator 20 of the second embodiment is moveable between a deployed position, wherein a substantial portion of the track 6 extends out of the track container 21 (as shown in FIG. 15), and a cruise position, wherein a substantial portion of the track 6 is received in the track container 21 (as shown in FIG. 17).

The track container 21 comprises a peripheral wall 23 having a flexible section 23A. The flexible section 23A has a concertina or corrugated arrangement comprising a plurality of ridges 24. The ridges 24 allow for elastic deformation of the peripheral wall 23 of the track container 21. Each of the ridges 24 extends circumferentially around the periphery of the track container 21.

The track container 21 comprises a first side 25A and an opposing second side 25B. The track container 21 is configured such that when the track container 21 is secured to the spar 2C of the wing assembly and the aircraft is grounded (as shown in FIG. 1), the track container 21 extends substantially horizontally in a direction away from the spar 2C. Furthermore, the first side 25A of the track container 21 faces upwardly and the second side 25B faces towards the ground. The position of the track container 21 when no force is exerted thereon by the track 6, and thus the track container 21 extends substantially horizontally and is not deformed, is referred to hereinafter as the 'rest position' (as shown in FIG. 15).

When the lift device actuator 20 is in the deployed position, rain water and ambient moisture is able to enter into the track container 21 through a gap between slat and the wing body. However, since the track container 21 is substantially horizontal, water does not collect in the closed end 11C of the track container 21 and so the amount of water that can accumulate in the track container 21, and thus the size of any ice deposit that forms in the track container 21, is reduced.

The track container 21 comprises a guide member in the form of a leaf spring 26. The leaf spring 26 comprises a guide surface 26A that is configured to guide the track 6 into the track container 21 when the track 6 is retracted into the track container 21. The guide surface 26A of the leaf spring 26 prevents the free end 6B of the track 6 from getting caught in the ridges 24 of the peripheral wall 23 when the lift device actuator 20 is moved between the deployed and cruise positions.

The leaf spring 26 comprises a first end 27A and a distal second end 27B. The first end 27A of the leaf spring 26 is coupled to the track container 21 proximate the open end 21B thereof. The second end 27B of the leaf spring 26 abuts the inside of track container 21 proximate the closed end 21C thereof. When the track container 21 is in the rest position, the leaf spring 26 is generally arcuate such that it arcs upwardly from each of the first and second ends 27A, 27B towards the centre of the leaf spring 26.

When the lift device actuator 20 is moved to the cruise position, the track 6 is retracted into the track container 21 and the free end 6B of the track 6 slides over the guide surface 26A of the leaf spring 26 and exerts a force on the leaf spring 26 that urges the second end 27B thereof against the inside of the track container 21 at the closed end 21C thereof. This causes a bending moment to be exerted on the track container 21 such that the track container 21 bends downwardly, causing the portions of the ridges 24 that are on the first side 25A of the track container 21 to be urged away from each other such that the spacing therebetween increases and the portions of the ridges 25 on the second side 25B of the track container 21 to be urged towards each other such that the spacing therebetween decreases. Therefore, the track container 21 is deformed from the rest position to a deflected position (as shown in FIG. 17) when the lift device actuator 20 is moved to the cruise position.

The peripheral wall 23 of the track container 11 is manufactured from a material having some resilience, for example, carbon fibre reinforced plastic, glass fibre reinforced plastic, or a metal, such as a castable aluminium, for example D357. Therefore, when the lift device actuator 20 is moved from the cruise position to the deployed position such that the free end 6B of the track 6 is no longer urged against the guide surface 26A of the leaf spring 26, the resilience of the material of the peripheral wall 23 will cause the portions of the ridges 24 on the first side 25A of the track container 21 to move back towards each other and the portions of the ridges 24 on the second side 25B of the track container to move back away from each other such that the track container 21 is urged to move back into the rest position. Therefore, the corrugated flexible section 23A of the peripheral 23 wall acts like a flexible bellows such that the track container 21 is elastically deformable from the rest position to the deflected position.

The resilience of the leaf spring 26 ensures that the leaf spring 26 is biased to return to its original curved shape (shown in FIG. 17) when the track 6 is moved out of the track container 21. The leaf spring 26 ensures that the force of the track 6 being retracted into the track container 21 is exerted on the same point on the inside of the track container 21 each time the lift device actuator 20 is moved into the cruise position such that the track container 21 is deformed in a consistent manner.

Figure 18:
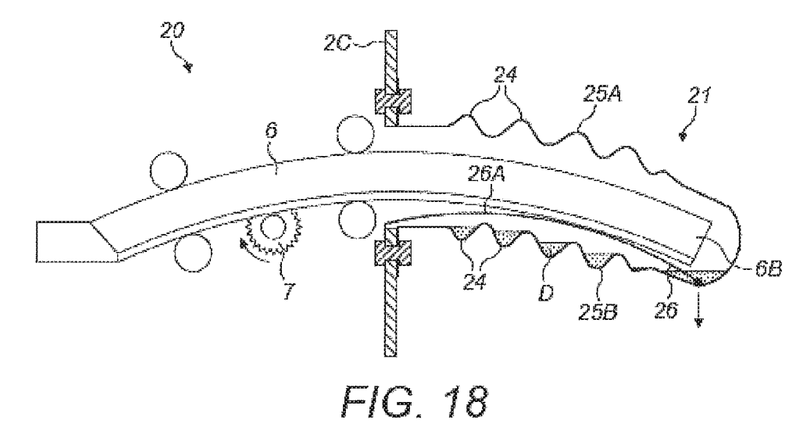
FIG. 18 is a schematic side vi-w of the lift device actuator of FIG. 15, in the cruise position.
Figure 19:
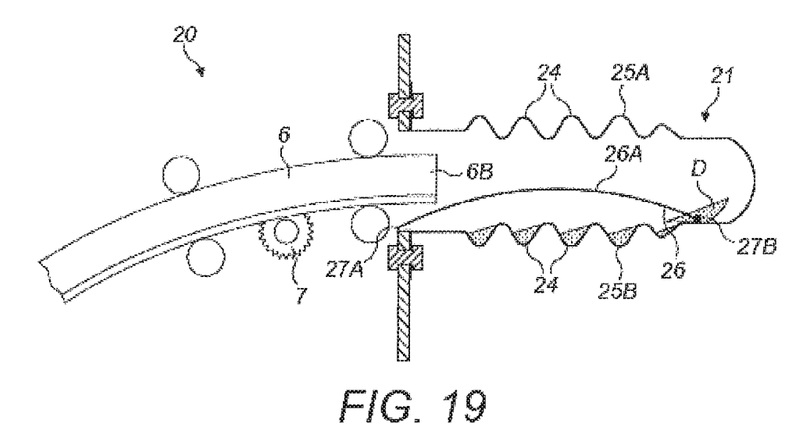
FIG. 19 is a schematic side view of e lift device actuator of FIG. 15, in the deployed position.

A small amount of water may accumulate in the ridges 24 of the flexible section 23A of the track container 21. This small amount of water may freeze to form ice deposits D (as shown in FIG. 18). However, the combined mass of all of the ice deposits D in the track container 21 will be less than the mass of the ice deposit D that forms in the track container 8 described above in relation to FIGS. 1-9, since less water can accumulate in the track container 21 of the present embodiment of the invention. Furthermore, the ice deposit D nearest the closed end 21C of the track container 21 will be dislodged from the peripheral wall 23 thereof when the lift device actuator 20 is moved into the deployed position (as shown in FIG. 19) such that when said ice deposit D melts some of the water will drain out of the track container 21.

Figure 20:
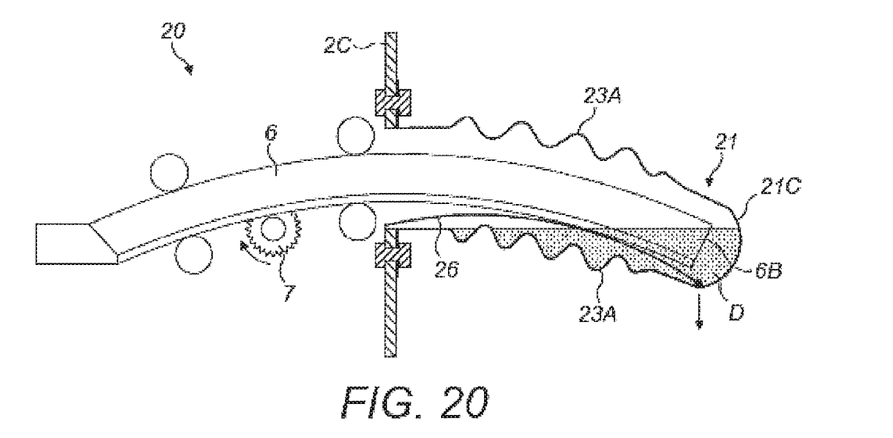
FIG. 20 is a schematic side view of the lift device actuator of FIG. 15, in e cruise position; and, FIG. 21 is a schematic side view oft e lift device actuator of FIG. 15, in the deployed position.
Figure 21:
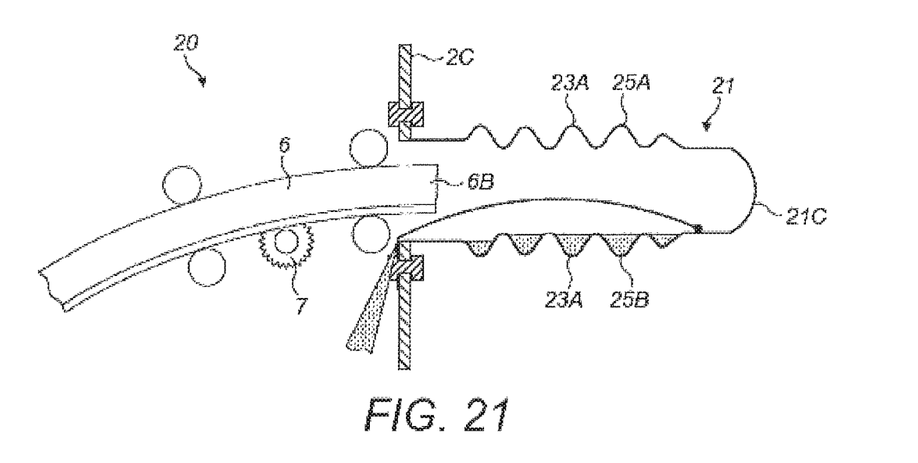

When the lift device actuator 20 is in the cruise position such that the track container 21 is bent downwardly into the deflected position, it is possible for water to accumulate in the track container 21 due to condensation. This water will collect in the lower closed end 21C of the track container 21 (as shown in FIG. 20). However, this water will be substantially drained from the track container 21 when the lift device actuator 20 is moved back to the deployed position. More specifically, when water has accumulated in the track container 21 and the lift device actuator 20 is subsequently moved back to the deployed position, the track container 21 is moved to the rest position such that the track container 21 is substantially straight and horizontal. This will result in the majority of the water that has accumulated in the track container 21 due to condensation being expelled from the track container (as shown in FIG. 21.). Therefore, it is not necessary for the track container 21 to include a drainage pipe, since the track container 21 essentially self-drains each time the lift device actuator 20 is moved into the deployed position.

In the above described embodiment, the guide member of the track container 21 is in the form of a leaf spring 26. However, in alternative embodiments (not shown) the guide member comprises another arrangement that is configured to guide the track into the track container. For example, in one embodiment the guide member comprises a flexible sheath that is located between the track and the track container. The flexible sheath prevents the track from contacting the corrugated arrangement of the peripheral wall and therefore prevents the free end of the track from becoming caught in the ridges of the peripheral wall. The flexible sheath may be manufactured from a resilient material, for example, an elastomeric material, that is configured to urge the track container into the rest position. In another embodiment, the guide member is omitted.

In the above described embodiments, the entire peripheral wall 13, 23 of the track container 11, 21 is manufactured from a resilient material. However, in alternative embodiments (not shown) only the flexible section of the track container is manufactured from a resilient material.

In the above described embodiments, the peripheral wall 13, 23 of the track container 11, 21 comprises a corrugated or concertina arrangement such that the track container 11, 21 is elastically deformable. However, it should be recognised that in alternative embodiments (not shown), the corrugated or concertina arrangement is omitted and is replaced by another means of making the track container elastically deformable. In one such embodiment (not shown), the peripheral wall of the track container comprises a flexible section in the form of a flexible material, for example, plastic sheet or rubber. In one such embodiment, the track container comprises a biasing member, for example, a spring or portion of resilient material, which is configured to bias the track container into the rest position.

Although in the above described embodiments the aircraft structure is in the form of a wing assembly 1A, it should be recognised that the present invention is suitable for use with other parts of the aircraft. Furthermore, although in the above described embodiments the lift device actuator 10, 20 is configured to move a lift device in the form of a slat, in alternate embodiments (not shown), the lift device actuator is configured to move a different type of lift device, for example, an aileron, elevator, spoiler, flap, Krueger flap, or rudder.

It will be appreciated that the foregoing description is given by way of example only and that modifications may be made to the present invention without departing from the scope of the appended claims.

The invention claimed is:

1. A track container for receiving a track of a lift device actuator, wherein the track container is elastically deformable from a rest position to a deflected position to accommodate said track, wherein the track container comprises a peripheral wall with a corrugated or concertina configuration, wherein the track container comprises a guide member in the form of an arcuate leaf spring configured to guide said track into the track container, wherein a first end of the arcuate leaf spring is coupled to the track container proximate an open end, and a second end of the arcuate leaf spring is coupled to the track container proximate a closed end.

2. The track container according to claim 1, comprising a biasing member that is configured to elastically bias the track container into the rest position.

3. The track container according to claim 1, wherein when the track container is elastically deformable in a direction transverse the central axis of the track container.

4. The track container according to claim 1, configured such that if the track is retracted into the track container when ice is present in the track container, the track container elastically deforms to accommodate the ice and the track.

5. The track container according to claim 4, wherein the track follows a curved path when retracted into the track container and wherein the track container has a curved shape when in the rest position that corresponds to said curved path of the track.

6. The track container according to claim 1, wherein the track container is configured such that the track exerts a force on the track container each time the track is retracted into the track container to urge the track container into the deflected position.

7. The track container according to claim 6, wherein the track container is substantially straight in the lengthwise direction when the track container is in the rest position.

8. The track container according to claim 6, wherein the track container is configured such that when the track container is mounted to an aircraft structure the track container extends substantially horizontally in the lengthwise direction of the track container.

9. The track container according to claim 1, wherein the guide member is configured such that when said track is retracted into the track container said track exerts a force on the guide member that causes the guide member to urge the track container into the deflected position.

10. The track container according to claim 1, wherein the guide member comprises a resilient sheath and, preferably, the resilient sheath comprises an elastomeric material.

11. The track container according to claim 1, manufactured from a fibre reinforced plastic.

12. The track container according to claim 1, manufactured from a low ductility metal and, preferably, comprising an aluminium casting.

13. The track container according to claim 1, wherein the track container is configured to receive a curved slat track.

14. An aircraft structure comprising a lift device, a track and a track container configured to receive the track, wherein the track container is elastically deformable from a rest position to a deflected position to accommodate the track, wherein the track container comprises a peripheral wall with a corrugated or concertina configuration, wherein the track container comprises a guide member in the form of an arcuate leaf spring configured to guide said track into the track container, wherein a first end of the leaf spring is coupled to the track container proximate an open end, and a second end of the leaf spring is coupled to the track container proximate a closed end.

15. An aircraft structure comprising a lift device, a track and a track container configured to receive the track, wherein the track container is elastically deformable from a rest position to a deflected position to accommodate the track, wherein the track container comprises a peripheral wall with a corrugated or concertina configuration, wherein the track container comprises a guide member in the form of an arcuate leaf spring configured to guide said track into the track container, wherein a first end of the leaf spring is coupled to the track container proximate an open end, and a second end of the leaf spring is coupled to the track container proximate a closed end, wherein the track container extends substantially horizontally in the lengthwise direction of the track container when the track container is in the rest position and wherein the track container is configured such that the track exerts a force on the track container each time the track is retracted into the track container to urge the track container into the deflected position.

* * * * *